Figure 1:
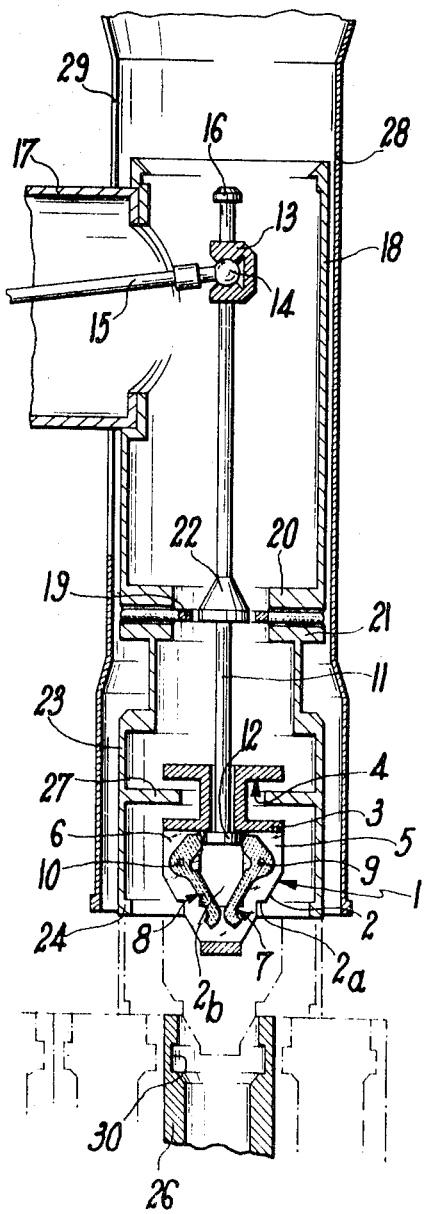

United States Patent

[11] 3,601,261

| [72] | Inventor | Gilbert Michot<br>Pertuis, France |
|---|---|---|
| [21] | Appl. No. | 793,281 |
| [22] | Filed | Jan. 23, 1969 |
| [45] | Patented | Aug. 24, 1971 |
| [73] | Assignee | Commissariat A L'Energie Atomique<br>Paris, France |
| [32] | Priority | Feb. 15, 1968 |
| [33] | | France |
| [31] | | 140027 |

[54] HANDLING GRAB, ESPECIALLY FOR NUCLEAR REACTOR FUEL ELEMENTS
3 Claims, 4 Drawing Figs.

[52] U.S. Cl. .................................................. 214/1,
294/95
[51] Int. Cl. .................................................. B25j 15/00
[50] Field of Search .................................... 214/1 RCM;
294/95

[56] References Cited
UNITED STATES PATENTS
3,164,267  1/1965  Jelatis............................  214/1 R CM 3,426,920  2/1969  Chesley..........................  214/1 R CM
FOREIGN PATENTS
1,315,403  2/1962  France ..........................  214/1 R CM
1,389,818  1/1965  France ..........................  214/1 R CM

*Primary Examiner*—Gerald M. Forlenza
*Assistant Examiner*—George F. Abraham
*Attorney*—Cameron, Kerkam & Sutton ABSTRACT: A handling grab comprising a body of revolution of generally conical shape, grappling claws pivotally mounted in said body, an axial operating rod having a terminal cam which can be displaced axially within said body so as to cause the pivotal movement of said claws between a position of withdrawal within said body and an outwardly projecting position, a cylindrical sleeve surrounding said operating rod and said body and having a terminal annular shoulder which is intended to be applied against fuel elements adjacent to the element to be engaged. The operating rod is connected to a positioning arm by means of a ball joint assembly so that the grab can be readily oriented about its axis and automatically realigned with any fuel element to be engaged in the event of misalignment of said grab.

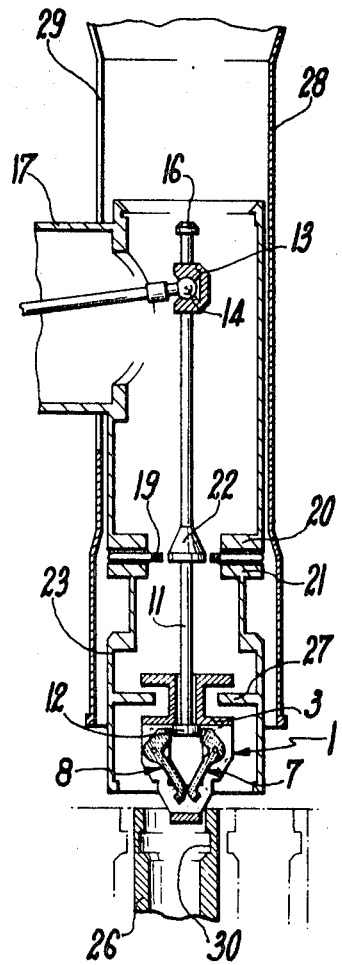
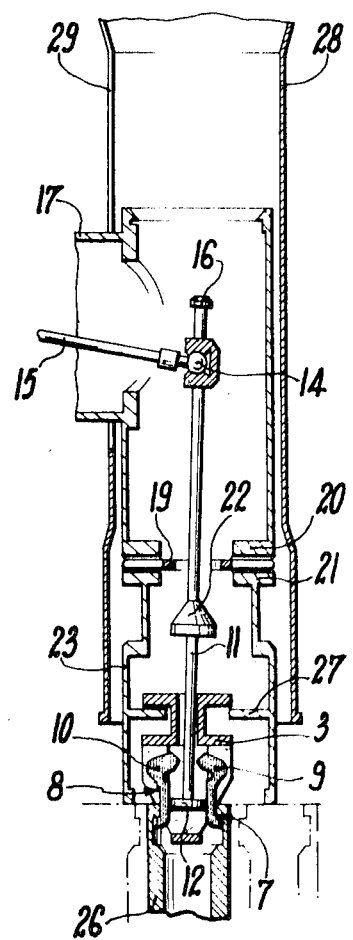
FIG. 3
FIG. 4

HANDLING GRAB, ESPECIALLY FOR NUCLEAR REACTOR FUEL ELEMENTS

The present invention relates to a handling grab which can be employed especially for the purpose of inserting and withdrawing fuel elements into and from a nuclear reactor core which is usually formed by the juxtaposed assembly of a plurality of fuel elements and/0r for the purpose of manipulating other objects such as control rod, protective sheaths for control rods and the like which are to be inserted into or withdrawn from the above-mentioned fuel element assembly, said grab being preferably remote controlled and mounted on the end of a positioning arm and said arm being passed in leaktight manner through the shield wall which is located above the reactor core.

By means of a system of very simple design which provides s highly reliable operation, the invention is mainly intended to permit easy orientation of the grab about its own axis with respect to its positioning arm as well as automatic realignment with the extremity of the fuel element to be taken from the core when said fuel element is positionally displaced with respect to the extremity of the arm on which the grab is mounted.

To this end, the handling grab under consideration comprises a body of revolution of generally conical shape provided with pins on which grappling claws are pivotally mounted within slots formed in said body, an axial operating rod provided with a member forming a cam which is adapted to penetrate axially into said body and to exert a force which causes the radial movement of said claws about the pivotal axes thereof between a position of withdrawal within said body and an outwardly displaced position in which said claws project from said body, and a cylindrical sleeve surrounding said operating rod and said body and provided with a terminal annular shoulder intended to be applied against the fuel elements which are adjacent to the extremity of the fuel element to be engaged, said grab being characterized in that the operating rod is connected by means of a balljoint assembly to a positioning arm which controls the axial movement through said body and that said operating rod is provided with a conical centering member which is adapted to cooperate with at least three equidistant radial fingers carried by the internal surface of said sleeve.

Apart from this main feature, a handling grab which is constructed in accordance with the invention has a number of other properties which will become apparent from the following description of one exemplified embodiment which is given by way of indication and not in any limiting sense, reference being made to the accompanying drawings in which FIGS. 1 to 4 are diagrammatic sectional view of the handling grab under consideration as shown in a number of different positions which serve to explain its operation.

Figure 2:
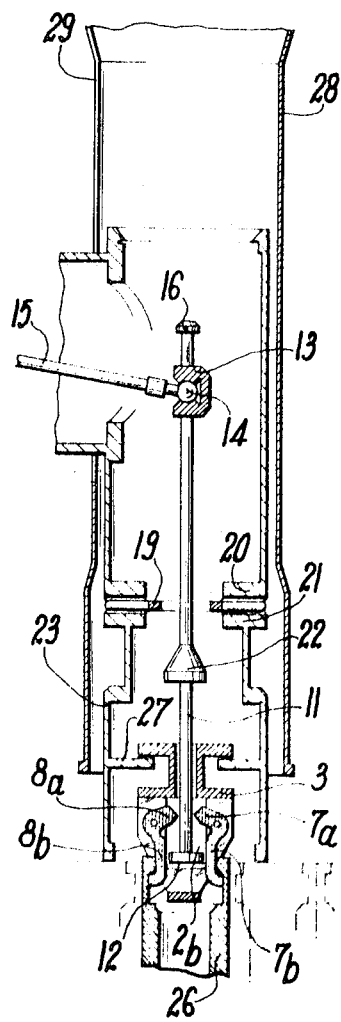

As shown in these figures, the grab comprises a body 1 constituted by a metallic member, a frustoconical portion 2 of said member being provided with a lateral stepped recess 2a and an extension in the form of a head 3 in which is formed a wide circular channel 4. Transverse slots which are two in number in the example considered and designated by the reference numerals 5 and 6 are formed in the member 1. Grappling claws 7 and 8 which are pivoted respectively about pins 9 and 10 carried by the body 1 are mounted within said slots. As will be readily understood, it would be possible to contemplate alternative constructions in which provision is made for a greater number of claws The movement of the claws 7 and 8 about their respective pins is obtained by means of an operating rod 11 fitted at its lower end with a member 12 s which forms a cam. Depending on the position taken up by said member 12 within a chamber 2b of the body 1 and under the action of an axial movement of displacement of the operating rod, said member 12 is capable of applying a thrust either on the heels 7a or 8a of the claws or on the central portion 7b or 8b of said claws (as shown in FIGS. 1 and 2). The operating rod 11 is fitted in the vicinity of its extremity which is remote from the cam 12 with a housing 13 for a balljoint 14 which is rigidly fixed at the end of a positioning arm 15. The pivotal movement of said arm about a pin (not shown) causes the axial displacement of the operating rod 11 within the body 1. The rod 11 is provided on the other side of the housing 13 with ahead 16 or suitable coupling member for an emergency tool (also omitted from the drawings) which is capable of exerting the necessary effort on the operating rod 11 in the event of locking or jamming of the positioning arm 15. The assembly which is formed by the body 1, rod 11 and arm 15 is mounted within a tubular bracket 17 which surrounds the positioning arm and is joined at one end to a cylindrical sleeve 18 in which the rod 11 is adapted to move. The sleeve 18 is fitted in the intermediate portion thereof with centering fingers such as the finger 19 which are provided in a suitable number (namely three in the example of construction considered, only two of which are visible in the plane of the figures). Said fingers are set in a radial in a radial position which can be adjusted by assembly between two flanges 20 and 21 of the sleeve 18 and are adapted to cooperate with a cone-shaped member 22 which is rigidly fixed to the operating rod 11. The sleeve 18 is provided at the lower end thereof with an enlarged annular portion 23, the extremity 24 of which is intended to bear on the heads of identical adjacent fuel assemblies 26. The annular enlargement 23 is provided in the central portion thereof with a circular flange 27 which is adapted to engage with play within the channel 4, the value of said play being such as to permit of relative displacement between the head 3 of the body 1 and the enlarged annular portion 23, the intended function of said displacement being explained in greater detail hereinafter. Finally, the grab whose different components have just been mentioned is mounted inside a cylindrical casing 28 which surrounds the sleeve 18 coaxially therewith. There is formed in the lateral surface of said casing a vertical slot 29 which is of sufficient size to permit the relative displacement of the bracket 17 and consequently to permit lifting or lowering of the sleeve 18 together with the components contained within this latter.

The operation of the handling grab can therefore be contemplated according to the different conditions which may arise, viz: viz:

1. Engagement of a fuel element which is located in axial alignment with the cylindrical casing (as shown in FIGS. 1 and 2):

in order to cause the claws 7 and 8 of the grab to grip a fuel element 26 by engaging within an annular groove 30 which is formed at the top portion of said fuel element, the mode of operation employed is as follows: the grab together with its components which are located in the position shown in FIG. 1, that is to say with its claws 7 and 8 withdrawn inside the body 1, is progressively lowered towards the duel element 26 to be engaged as a result of a movement which is produced by an external mechanism (not shown) of the tubular bracket 17 with respect to the cylindrical casing 28. At the end of travel, the abutment shoulder 24 of the annular enlargement 23 is applied against the top face of the adjacent fuel assemblies, the frustoconical portion 2 of the member 1 being engaged as a result of correct centering of the components in central alignment with the extremity of the fuel element 26. During this downward movement, the body 1 is also centered in coaxial relation with the sleeve 18 by virtue of the conical member 22 which is adapted to cooperate with the fingers 19 as long as the operating rod 11 is located in the top position, that is to say as long as the cam 12 produces action solely on the heels 7a and 8a of the claws 7 and 8 so as to maintain these latter in the withdrawn position (as shown in FIG. 1). On the other hand, the downward motion stops when the abutment shoulder comes into contact with adjacent fuel assemblies: at this moment, the stepped recess 2a is located at a given distance from the extremity of the fuel element.

In the following stage, the pivotal movement of the positioning arm 15 is initiated by the mechanism which is associated therewith, with the result that the operating rod 11 and the body 1 move downwards into the head of the fuel element 26 while the stepped recess 2a engages until it comes into abutment with said element. As the downward movement of the rod 11 continues, the member 22 moves away from the fingers 19 whilst the cam 12 penetrates into the chamber 2b and moves down below the heels 7a and 8a of the claws so as to apply a force on the central portions 7b and 8b of said claws which are consequently displaced outwards in a radial movement so as to penetrate into the groove 30. At the end of travel of the cam 12, the stage of locking onto the fuel element is completed. A movement of the sleeve 18 in the opposite direction makes it possible to withdraw the fuel element which has thus been engaged. It should be noted that, while the above-described arrangements are being carried into effect, the relative position of the fuel element which has been gripped or positioned can be controlled with respect to adjacent fuel elements. To this end, the depth of the chamber 2b is determined so as to permit a complementary range of travel of the cam 12 beyond the position corresponding to the outward displacement of the grab claws which results from the action produced on the central portions 7b and 8b said claws, the precise object of said complementary range of travel being to permit the possibility of controlling the position of the fuel element considered. When the fuel element is located exactly at the same level as the adjacent fuel elements, the cam 12 can move downwards to the bottom of the chamber 2b over a given distance. On the other hand, when the fuel element is located at a higher level than that of the adjacent elements, the downward movement of the cam to the bottom of the chamber is carried out only over a distance which is shorter than the preceding by the difference in level between said fuel element and the surrounding fuel elements. This variation is transferred to the components which serve to actuate the rod 11 and thus makes it possible to control the position of fuel elements or at least to provide the operator with an order of magnitude.

The foregoing arrangements are shown diagrammatically in FIGS. 1 and 2, the fuel elements being shown as being located at a slightly different level with respect to the fuel element 26 which has been engaged by the grab claws.

2. Engagement of a fuel element which is misaligned with respect to the axis of the cylindrical grab-casing (as shown in FIGS. 3 and 4):

In this case, the mode of operation which is contemplated is similar in its first stage to the operation described with reference to FIGS. 1 and 2, the grab and its retracted claws being progressively lowered towards the fuel element to be engaged, the member 22 being located under these conditions at the level of the fingers 19 and centered by these latter within the sleeve 18. During this downward movement, the lower end of the frustoconical portion 2 of the member 1 comes into contact with the extremity of the fuel element 26 (as shown in FIG. 3) and causes a relative pivotal movement of the operating rod 11 about the balljoint 14. As the downward movement of the grab continues, the frustoconical portion 2 is automatically centered and penetrates progressively into the head of the fuel element 26 until the enlarged annular portion 23 which follows the movement of the member 1 is brought into contact with adjacent fuel element assemblies by means of its abutment shoulder 24. At this moment, the sleeve 18 is arrested and the positioning arm 15 is then pivotally operated in such a manner as to cause the axial displacement of the rod 11 and the engagement of the stepped recess 2a in the head of the fuel element 26. As the movement of the rod continues, the claws begin to separate when the cam 12 moves clear of the heels 7a and 8a and cooperates with the central portions 7b and 8b of the claws which are thus displaced to their fully separated position within the groove 30 as in the mode of operation which was described earlier. At the end of travel, the cam 12 comes into abutment against the bottom of the chamber 2b of the body 1.

In the two principal modes of operation which have been considered in the foregoing, the handling grab in accordance with the invention is distinguished by the fact that floating portion consisting of the operating rod and the body which supports the gripping claws is associated with a guiding portion consisting of the sleeve which is abuttingly applied against the fuel element assemblies located next to the fuel element to be engaged. By virtue of this association, said fuel element can be engaged by the handling grab irrespective of the extent to which this latter may be misaligned with respect to its normal position. In addition, the connection provided between the operating rod and positioning arm by the balljoint assembly makes it possible not only to realign the axis of the grab with respect to the axis of the fuel element but also permits of relative rotational motion, thereby ensuring that the grappling claws are always correctly presented as a result of self-orientation of the grab about its own axis. Finally, the fact that an annular guide channel is provided in the claw-support body in conjunction with a circular flange carried by the sleeve makes it possible to limit the displacements of these two components in all circumstances and, as a result of mechanical abutment, to lift the complete assembly in the event of jamming of a fuel element or locking of the positioning arm; in the case last mentioned, the operating rod is gripped by an emergency tool which can be inserted freely in the centerline of the cylindrical casing in order to engage the coupling member which is provided at the upper end of the operating rod 11 and to draw this latter upwards by applying the necessary axial force.

As will be readily understood, the invention is not limited to the exemplified embodiment which has been more particularly described with reference to the accompanying drawings but extends on the contrary to all alternative forms.

I claim:

1. A handling grab for nuclear reactor fuel elements comprising a body of revolution of generally conical shape provided with pins on which grappling claws are pivotally mounted within slots formed in said body, an axial operating rod provided with a member forming a cam which is adapted to penetrate axially into said body and to exert a force which causes the radial movement of said claws about the pivotal axes thereof between a position of withdrawal within said body and an outwardly displaced position in which said claws project from said body, and a cylindrical sleeve surrounding said operating rod and said body and provided with a terminal annular shoulder to be applied against the fuel elements which are adjacent to the extremity of the fuel element to be engaged, said operating rod being connected by a balljoint assembly to a positioning arm which controls the axial movement of said rod through said body, said operating rod having a conical centering member cooperating with at least three equidistant radial fingers carried by the internal surface of said sleeve, said body being rigidly fixed at the top portion thereof to a head, a circular channel in said head in which is engaged with substantial play an annular flange carried by said sleeve, said channel permitting a relative displacement of said body with respect to said sleeve, said displacement being limited by the abutment of said annular flange against the faces of said channel.

2. A handling grab in accordance with claim 1, characterized in that said operating rod is provided beyond the balljoint assembly aforesaid with a coupling member for fastening an emergency tool thereon and exerting an axial force on said operating rod in the event of jamming of said positioning arm.

3. A handling grab in accordance with claim 1, characterized in that said sleeve is secured to a tubular bracket which surrounds said positioning arm and permits an axial displacement of said sleeve within a stationary protective casing which is coaxial with said sleeve.